June 20, 1933.    H. L. KRAEFT    1,914,811
JOINING METAL PARTS INCLUDING TUBES
Filed Dec. 29, 1930    2 Sheets-Sheet 1

Inventor
Herman L Kraeft
By Bates, Goldrick & Teare
Attorney

June 20, 1933. H. L. KRAEFT 1,914,811
JOINING METAL PARTS INCLUDING TUBES
Filed Dec. 29, 1930  2 Sheets-Sheet 2

Inventor
Herman L. Kraeft
By Bates, Goldrick & Teare
Attorney

Patented June 20, 1933

1,914,811

UNITED STATES PATENT OFFICE

HERMAN L. KRAEFT, OF CLEVELAND, OHIO, ASSIGNOR TO MURRAY-OHIO MFG. COMPANY, OF CLEVELAND, OHIO, A CORPORATION OF OHIO

JOINING METAL PARTS INCLUDING TUBES

Application filed December 29, 1930. Serial No. 505,220.

This invention is mainly concerned with a welding method or process, particularly electric butt welding. The objects include the provision of an improved method of welding metallic members together to form joints between them, where one or more of such members are tubular.

Another object is to provide a welding method by which a solid or hollow metal bar may be effectively joined to a hollow metal bar (tube) in transverse relationship, to form various shapes; T's, L's, and Y's, for example.

Further objects include the provision of a new and relatively inexpensive method of electrically butt welding a metal member to a metal tube, which method will result in an unusually strong, though simple, joint.

Another object is to provide a new and effective method of reinforcing tubular parts during a welding operation to form a joint, whereby the necessary pressure to effect a complete consolidation of the metal of the tube and the member welded thereto, may be applied to the parts, being welded, without danger of distorting such tube, or shearing, or breaking through the wall thereof, while the metal is under welding heat.

Specific objects include the provision of a new method of forming and reinforcing cycle and like frame parts particularly tubular frame units.

Other objects and features of the invention will become apparent from the following description of the invention relating to the accompanying drawings. The drawings illustrate the preferred manner of carrying out the method in the various aspects thereof, and the preferred forms of the instrumentalities employed and provided. The essential characteristics are summarized in the claims.

Figure 1:
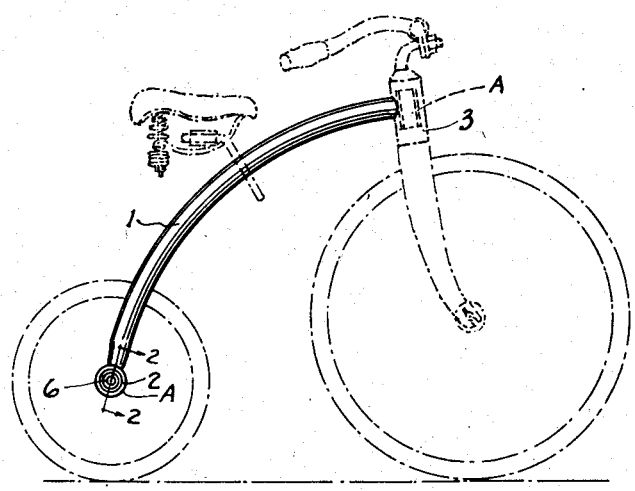
Figure 2:
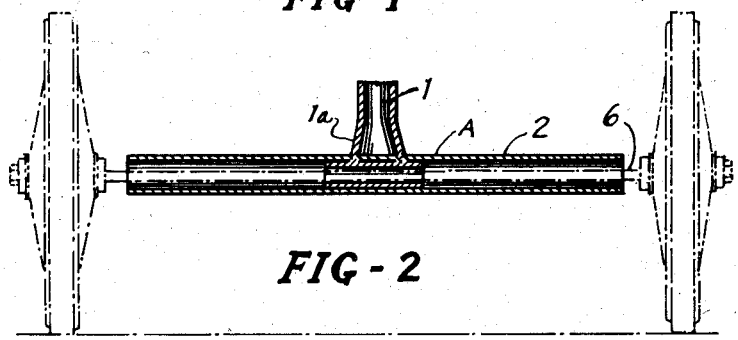
Figure 3:
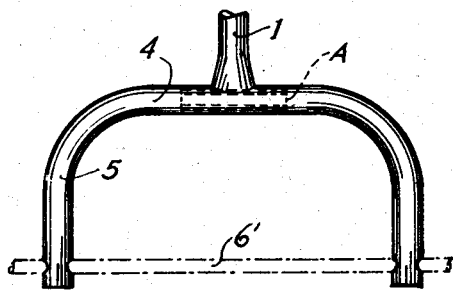
Figure 4:
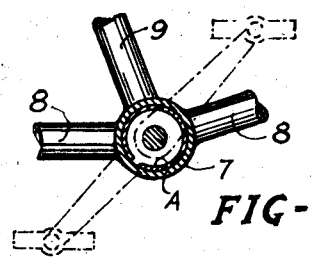
Figure 6:
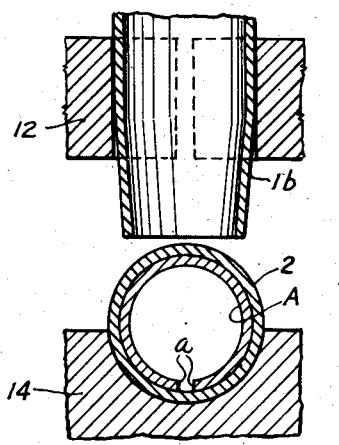
Figure 7:
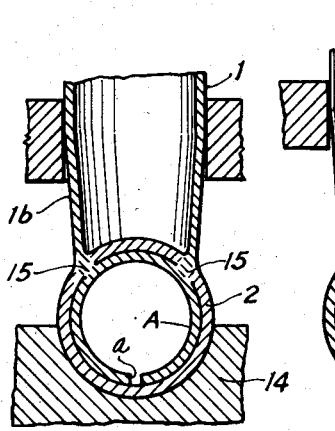
Figure 7A:
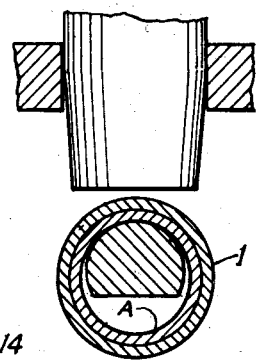
Figure 5:
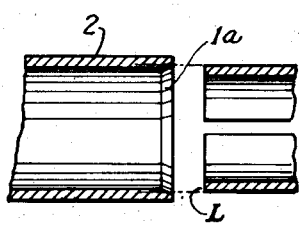
Figure 9:
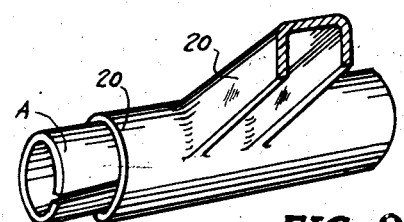
Figure 8:
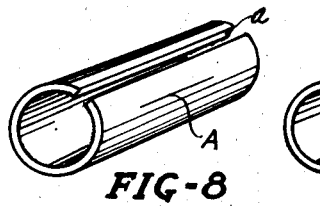
Figure 10:
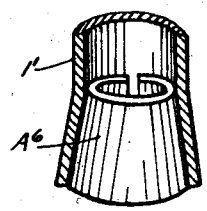
Figure 11:

In the drawings, Fig. 1 is a side view of a tricycle frame made by the present method; Fig. 2 is a transverse cross sectional view therethrough, taken along the line 2—2 on Fig. 1; Fig. 3 is a rear elevation of a portion of a different form of velocipede frame adapted to be constructed according to the present invention; Fig. 4 is a diagrammatic fragmentary view of a portion of a bicycle frame, also adapted to be made according to the present invention; Figs. 5, 6 and 7 are sectional, largely diagrammatic, views, illustrating certain steps in the method; Fig. 7a is a view similar to Fig. 6, showing a modification in the manner of applying welding current and pressure; Figs. 8 to 8D are exemplary forms of reinforcing members applicable to the present method; Fig. 9 is a view showing a tube and structural bar adapted to be joined by the present method, and Figs. 10 and 11 are diagrammatic illustrations of other possible modifications of the present invention.

Ordinarily tubular metal members are joined to each other and to bars of various shapes through the use of more or less conventional strengthening fittings or adapters. I have found that, by virtue of a simple expedient, these conventional fittings and adapters may be largely done away with in assembling and joining tubular parts, without weakening the structure formed by such joining; in fact, I have found it possible to make the joints stronger than the tube stock at the non-joining portions thereof.

Briefly, the expedient, in its simplest terms, comprises interiorly bracing or reinforcing the wall of a tube, to be joined to another tube or bar, with metallic reinforcing means, adapted to be left in place in the tube; the end of such other tube or bar being applied and joined to the tube containing the reinforcing means, at the reinforced region, under sufficient pressure, and by the application of adequate welding heat, to consolidate the two parts directly together. Various modifications and refinements will be hereinafter discussed.

Referring again to the drawings, I have shown a few examples of frame structures especially well adapted to be made by the present process or method. Figs 1 and 2 show a tricycle backbone at 1, a cross beam or axle support at 2, and a front fork column at 3. These parts are all tubular, as shown, and the tubes may be of any suitable metal or alloy, capable of being welded. Preferably the tubes are steel. Fig. 3 shows a form of cross beam, at 4, of a common type, with downwardly bent arms at 5. In the form of cross beam shown in Figs. 1 and 2, the axle 6 for the rear wheels may pass entirely through the beam, but, in the other form illustrated, the axle 6' passes through transverse openings near the ends of the downwardly bent arms. Suitable supporting bearings, etc. are, of course, provided for the axles, but are not illustrated. Fig. 4 shows exemplary bicycle frame parts, also well adapted to be joined by the present method; 7 indicating a tubular crank hanger housing, and 8 and 9 backbone sections, and a seat supporting mast, respectively. The joint between each two joined tubular sections, in the above illustrative examples, includes a metal insert, indicated at A in all figures, lying within the tube to which another frame member is transversely joined at the end of the latter.

Referring now to Figs. 5 to 7, the tubular members 1 and 2 may be taken to illustrate the essential steps. In Figs. 5 and 6, the end of the tube 2 is shown as chamfered at 1a to receive the insert A which, it will be observed, comprises simply a strip of sheet metal formed into a cylindrical sleeve; the ends, at a, not quite touching. Now if the sleeve is formed slightly over size, see lines L, the sleeve, in being compressed slightly to enter the end of the tube, will afterward expand to closely fit the tube, and stay wherever it is placed. The insert is of course, positioned in the desired location for the joint, and in the case of a frame member, such as 4 in Fig. 3, the insert is located in the tube before the arms 5 are bent. In the tricycle frames shown, it is desirable to increase the lateral dimensions of the lower end of the tube 1 to buttress this end against side strain, and this may be conveniently done by flattening the end of the tube, thus widening the end in one plane (see 1a in Fig. 2), and narrowing, or rather tapering, it in a plane at right angles thereto. The taper effect may be noted at 1b in Figs. 6 and 7. The taper has an advantage in that the weld may be accomplished without running the joint very far down around the walls of the tube 2.

The tubes 1 and 2 may be mounted in suitable fixtures, on a welding apparatus, such fixtures including, for example, recessed copper blocks 12 and 14 on a welding machine, and the tubes then brought together to effect the weld. Assuming the blocks are connected to a suitable source of electric power, properly controlled as usual, the tubes are now brought forcibly together under the welding heat generated by the current, and fused into a single piece of metal, as shown in Fig. 7. The reinforce, insert A, cooperates with the other welding instrumentalities as follows: As the wall of the tube 2 heats up it weakens, and the insert prevents it from being caved in by the oncoming tube stock of the member 1. Further, the insert conducts considerable of the heat away from the wall of the tube 2 surrounding the weld and prevents this surrounding wall from excessive melting and/or wrinkling. Further, the insert adds local wall stock to the tube, whenever this is needed to perfect the weld. Ordinarily, the sleeve will become welded to the interior of the tube 2, as at 15, whereupon, the metal of the sleeve, by becoming consolidated with the metal of both tubes (with 1 through the medium of the wall of 2), adds permanent reinforcement to the entire joint; the weld at 15 positively preventing the sleeve from becoming displaced along the tube containing it. Assuming the operative exercises average skill, the joint formed as above described, will be found to require substantially no finishing operations, there being very little, if any, fin formation or other irregularities.

The position and character of the blocks 12 and 14 are exemplary only. If desired, and where feasible, one of the blocks may lie within the respective tube. In Fig. 7a, for example, the block is so disposed as to press the adjacent surfaces of the sleeve and tube 2 toward each other at the welding region. The spring of the formed split sleeve is ordinarily sufficient to accomplish the desired contact and therefore Fig. 7a may be taken to illustrate another way of securing the desired contact pressure, in case the sleeve is undersize and does not properly fit the tube.

Figure 8A:
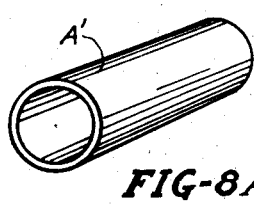
Figure 8B:
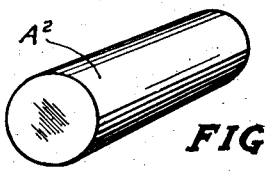
Figure 8C:
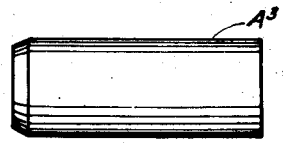
Figure 8D:
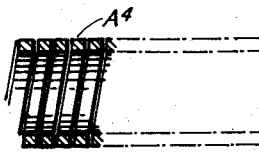

In Figs. 8A to 8B are shown several exemplary alternative forms of inserts, that of Fig. 8A, (at A') being a sleeve but not split; that of Fig. 8B (at A2) being solid; that of Fig. 8C (at A3) being of any nature but beveled to facilitate inserting the same into a tube, and that of Fig. 8D (at A4) being spirally split and therefore compressible. Other forms of inserts not cylindrical in form may be employed without departing from the spirit of my invention.

Fig. 9 illustrates a frame joint of general utility and in which a channel-shaped arm, 20, is secured to a tube 21, in accordance with the present method, the arm being a substantially conventional channel bar section instead of a tube.

In case it is desired to reinforce the endwise abutting member of the joint, the device of Figs. 10 and 11 may be employed. In these figures, an insert, A6, preferably a split compressible sleeve is forced into the end of the tube 1' before the two tubes are brought together, the sleeve retaining its position by reason of expanding in place. Thus, by the arrangement of Fig. 11, the shearing stress at the joint is resisted by both inserts, and the disruptive forces tending to break the joint under hard usage, are distributed along all arms of the structure.

I claim:

1. In frame construction, the method of welding to form a joint between a metal tube and one end of a cooperating transverse frame member, comprising reinforcing the interior of the tube at the desired location for the joint, and then forcibly bringing the tube and such member together under welding heat.

2. The method of reinforcing the wall of a tube during an electric butt-welding operation consisting in forcing a metallic insert into the tube in intimate contact with the interior walls thereof in the desired region of the weld, whereby one end of a transverse member butt-welded to the said wall by the application of welding heat and pressure will not materially deform such wall in the region of the weld.

3. The method of joining a metal bar to a tube to form a frame unit, comprising, placing a metallic reinforce inside the tube in the desired region for the weld and electrically butt-welding the end of the bar to the tube at such region.

4. The method of forming metallic frames, comprising placing a metallic insert in a metal tube, assembling a frame member into endwise abutting transverse relationship to the tube in the region of such insert and applying welding heat and pressure sufficient to weld the end of such frame member to the wall of the tube.

5. The method of forming metallic frames, comprising placing a metallic insert in a metal tube, assembling a metal frame member into endwise abutting transverse relationship to the tube in the region of such insert and applying welding heat and pressure sufficient to weld the end portion of the member to the exterior wall surface of the tube and to weld the insert to the opposite interior wall surface.

6. The method of forming tubular frames, comprising inserting a metallic reinforce member in one of two tubes to be joined and welding the end of the other tube thereto in the region of the insert.

7. The method of joining a metal bar to the side wall of a metal tube, comprising locally reinforcing the interior surface of the tube in the desired region for the joint, and bringing the bar and tube together under welding heat and pressure sufficient to integrally join the bar and tube.

8. The method of forming tubular cycle frames comprising, forcing a metallic reinforcing insert into one of two tubes to be joined in angular relationship, causing the insert to be intimately embraced by the inner wall surface of such tube, and electrically welding the end of the other tube to the first mentioned tube at the position of said insert.

9. A method of making frames from metal parts including a tube, comprising forcing a yieldingly compressible sleeve into such tube in the desired region for the weld and forming the weld by the application of heat and pressure between the frame parts to be welded, sufficient to cause the sleeve to be welded to the interior of such tube.

10. The method of providing a welded frame joint, for tubular frame parts, comprising placing a metallic insert in one tube in the desired region of the weld and welding the end of another tube to the wall of the first, integrally joining one tube with the insert through the medium of the wall of the other tube.

11. The method of making frames from tubes, comprising, forcing a metallic reinforcing member into one of two tubes to be joined, and butt-welding the end of one of such tubes to the tube containing such member, opposite the member, maintaining the welding heat for a sufficient period to cause such end of one of the tubes to be welded to the wall of the tube which contains the member.

12. The steps in the method of forming tubular frames comprising, placing a metallic reinforcing insert into one of two tubes, arranging the tubes in angular relationship and applying welding heat and pressure to butt weld the end of one tube to the tube containing the insert, causing the insert and such end to be integrally joined through the medium of the wall of the first mentioned tube.

13. The method of joining tubes to form a frame, comprising, forcing a compressible metallic insert into one of two tubes to be joined, and butt-welding the tubes together in the region of the insert.

14. The method of forming a cycle frame including tubular parts which comprises the steps of forcing a compressible pre-formed metallic reinforcing mmeber into a tube in the desired region of the joint, and butt-welding the end of a metal frame member to the tube opposite such reinforce.

15. The method of making a tricycle frame, including a metal backbone and a transverse metal tube adapted to support an axle, comprising positioning a metallic insert in intimate contact with the inner surface of said transverse tube at a point intermediate the ends of the latter and electrically butt-welding the ends of the backbone directly to the wall of the transverse tube at that point.

16. The method of making a welded frame joint between a tubular member and a transverse member, comprising placing a metal insert in contact with the inner walls of the tubular member in the desired region of the weld, abutting the transverse member against the exterior wall of the tubular member opposite the insert, and applying a welding current through a connection with each member.

17. In a cycle frame the combination of a metallic insert within a tube, a transverse metallic member secured to the outer wall of the tube opposite the insert, the metal of the transverse member being fused with the outer wall of the tube and the metal of the insert being fused with the inner wall of the tube.

In testimony whereof, I hereunto affix my signature.

HERMAN L. KRAEFT.